Aug. 30, 1955          G. E. DRIVER          2,716,523
DEVICE FOR COUNTING ALPHA AND BETA PARTICLES
Filed June 15, 1951
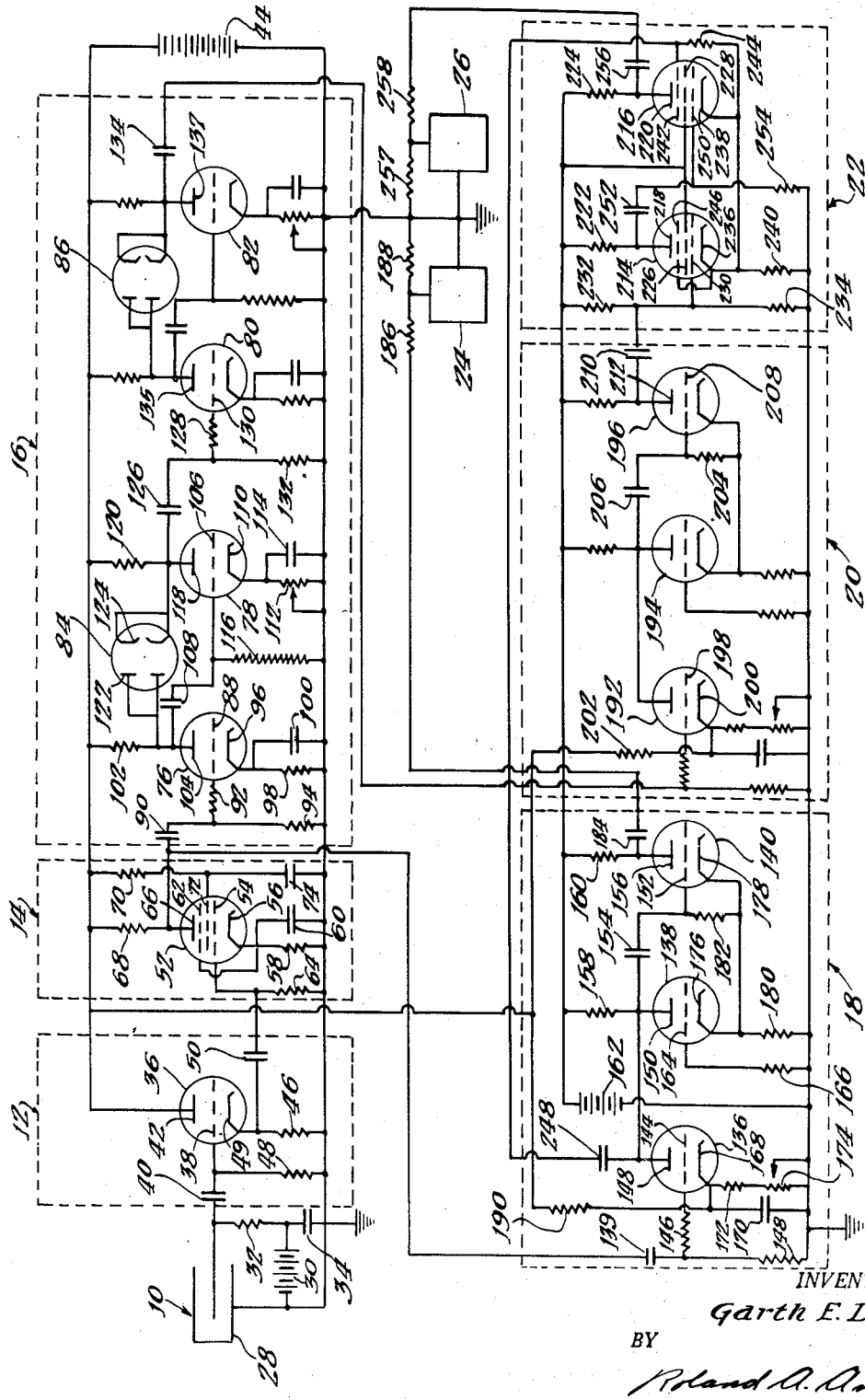
INVENTOR.
Garth E. Driver
BY
Roland A. Anderson
Attorney:

United States Patent Office 2,716,523
Patented Aug. 30, 1955

2,716,523

DEVICE FOR COUNTING ALPHA AND BETA PARTICLES

Garth E. Driver, Richland, Wash., assignor to the United States of America as represented by the United States Atomic Energy Commission Application June 15, 1951, Serial No. 231,735

10 Claims. (Cl. 235—92)

The present invention relates to devices for separating pulses of different amplitudes, and more specifically to devices for simultaneously measuring alpha and beta particles.

Alpha particles are known to produce much greater ionization of a gas than beta particles, and hence the pulses produced in a counter tube by alpha particle radiation have much greater amplitudes than beta produced pulses in the same counter tube. For this reason, the radiation measuring devices of the past have been unable to simultaneously measure beta particles and alpha particles, because the alpha particles have sufficient energy to overdrive the amplifier required in such devices to measure beta particles. Generally, overdriving the amplifier has the effect of giving rise to multiple pulsing and results in a spuriously high radiation count. The problem is accentuated when the energy of the beta particles differs very greatly from that of the alpha particles, which in general means that beta particles with energies of the order of from .01 m. e. v. to 1 m. e. v. in the presence of alpha particles present the most difficulty. One consequence of this difficulty is that counters may not be calibrated with standards which eject both alpha and beta particles. Hence, it is an object of the present invention to provide a device for simultaneously counting alpha and beta particles impinging upon a counter tube.

A further object of the invention is to provide apparatus for separating pulses of different amplitudes which may be utilized for counting alpha and beta particles.

It is also an object of the present invention to provide a device for counting beta particles having energies in the order of 0.01 m. e. v. in the presence of alpha particles.

The invention may be more readily understood with reference to the drawing which consists of a single figure showing the electrical schematic diagram of the device.

In general, the device consists of a counter tube circuit 10, a cathode follower 12, an amplifier 14, a beta amplifier 16, an alpha multivibrator 18, a beta multivibrator 20, a gated multivibrator 22 and two scalers 24 and 26. The counter tube circuit 10 generates pulses in response to both alpha and beta particles. The cathode follower 12 conducts these pulses to the amplifier 14 which amplifies both alpha and beta pulses. The beta pulses have insufficient amplitude to trigger the alpha multivibrator 18, but are conducted through the beta amplifier 16. The alpha pulses are conducted through the amplifier 14 to the alpha multivibrator and they have sufficient amplitude to trigger the alpha multivibrator 18, thus producing a pulse which is counted by the alpha scaler 24. Both beta pulses and alpha pulses emerge from the beta amplifier 16, and are of sufficient amplitude to trigger the beta multivibrator 20. However, between the beta multivibrator 20 and the beta scaler 26 the pulses must pass through the gated multivibrator 22, which is connected to the apha multivibrator 18 and blanks out alpha pulses so that they will not be counted by the beta scaler 26.

More specifically, the counter tube circuit 10 consists of a counter tube 28, a source of voltage, such as battery 30, and a resistor 32, all connected in series. A condenser 34 is connected across the battery 30 in an effort to prevent undesirable pick-up voltage from being introduced into the apparatus. The counter tube 28 is a methane flow counting chamber, but might well be a windowless beta proportional counter. It must, of course, be capable of counting both alpha and beta particles, which in general means that a portion of the alpha and beta plateaus must appear at a common voltage, so that this voltage may be applied to the counter tube 28. It has been found that suitable values for the resistor 32 and the condenser 34 are 1 megohm and 0.01 mfd., respectively.

The cathode follower 12 is a conventional circuit using a vacuum tube 36 having a grid 38 connected to the counter tube circuit 10 through a coupling condenser 40. The plate 42 of the tube 36 is connected to a source of voltage, such as battery 44. Cathode resistor 46 and grid resistor 48 are connected between the cathode and grid, respectively, to the negative terminal of battery 44, which serves as a common ground. Output from the cathode follower 12 is coupled from cathode 49 of tube 36 through an output coupling condenser 50. It has been found that a type 6C4 is a suitable vacuum tube for the tube 36, that input coupling condenser 40 may be 40 mmfd., and output coupling condenser 50 may be 0.0005 mfd. A 1 megohm resistor is suitable for the grid resistor 48 and a 10,000 ohm resistor is suitable for the cathode resistor 46.

The amplifier 14 has a vacuum tube 52 with a grid 54 which is connected to the output coupling condenser 50 of the cathode follower 12. The cathode 56 of the tube 52 is connected to the common ground, i. e. the negative terminal of battery 44, through the cathode resistor 58 and condenser 60. The cathode 56 is also connected to the suppressor grid 62 of the vacuum tube 52. A grid resistor 64 is connected between the grid 54 and the common ground. The plate 66 of the tube 52 is connected to the positive terminal of the battery 44 through a plate resistor 68. A screen resistor 70 connects the screen grid 72 of the vacuum tube 52 to the positive terminal of the battery 44, and a screen by-pass condenser 74 is connected between the screen grid 72 and the common ground. It has been found that type 6AU6 tube is suitable for tube 52 and that other components may be of conventional dimensions.

The beta amplifier 16 consists of two pairs of triode vacuum tubes, one pair being tubes 76 and 78 and the other pair being tubes 80 and 82, with diode vacuum tubes 84 and 86 connected between the tubes of each pair. The grid 88 of the first triode 76 is connected to the plate 66 of tube 52 in the amplifier 14 through coupling condenser 90 and resistor 92. A grid bias resistor 94 is connected between the junction of condenser 90 and resistor 92 and the common ground. The cathode 96 of tube 76 is also connected to the common ground through cathode resistor 98 and condenser 100. A plate load resistor 102 connects the plate 104 of tube 76 to the positive terminal of battery 44. The plate 104 of vacuum tube 76 is connected to the grid 106 of vacuum tube 78 through coupling condenser 108. The cathode 110 of tube 78 is connected to the common ground through a voltage divider 112 and a by-pass condenser 114. The grid resistor 116 is connected between the grid 106 and the common ground. The plate 118 of vacuum tube 78 is connected to the positive terminal of the battery 44 through a plate resistor 120. The plate 104 of vacuum tube 76 is connected to the plate 118 of vacuum tube 78 through the diode vacuum tube 84, the plates 122 of the diode vacuum tube 84 being connected to the plate 104 of tube 76, and the cathodes 124 of diode vacuum tube 84 being connected to the plate 118 of vacuum tube 78.

Vacuum tube type 12AU7 has been found to be satisfactory for both vacuum tube 76 and 78, and type 6H6 has been found satisfactory for the diode tube 84. The coupling condenser 90 may have a capacity of 0.0001 mfd. and coupling condenser 108 may have a capacity of 0.01 mfd. The cathode by-pass condensers 100 and 114 may be 50 mfd. and the plate resistors 102 and 120 approximately 47,000 ohms. The grid resistor 94 of vacuum tube 76 may be 18,000 ohms, while a suitable value for the grid resistor 116 of vacuum tube 78 has been found to be 1,000 ohms. Resistor 92 in the grid circuit of vacuum 76 may be approximately 100 ohms, and the cathode resistor 98 in that tube may be approximately 1,000 ohms. The voltage divider in the cathode circuit of tube 78 should be approximately 2,000 ohms.

The second pair of triodes 80 and 82 are connected in an identical circuit to the first pair of triodes 76 and 78 described above. However, the circuit is connected in cascade with the first triode pair 76 and 78 through a coupling condenser 126. The grid circuit for this triode pair 80 and 82 is identical with the grid circuit of the other triode pair 76 and 78, and has a resistor 128 which connects the grid 130 of vacuum tube 80 to the coupling condenser 126. A grid resistor 132 is connected between the junction of condenser 126 and resistor 128 to the common ground. Voltage is supplied to the plates 135 and 137 of tubes 80 and 82 by battery 44, as in the case of tubes 76 and 78.

The components for the triode pair 80 and 82 may be identical with the components used in the triode pair 76 and 78, except that a 0.0001 mfd. coupling condenser 126, a 1,000 ohm grid resistor 132, and a 330,000 ohm resistor 128 have been found more desirable. An output coupling condenser 134 is connected to the plate 137 of the second tube 82 of the second triode pair and couples the output of the beta amplifier 16 to the input circuit of the beta multivibrator 20. It has been found that a 0.01 mfd. condenser is suitable for condenser 134.

The output of amplifier 14 is also coupled to the alpha multivibrator 18 by a condenser 139 which is connected between the plate 66 of vacuum tube 52 and the input circuit of the alpha multivibrator 18. The alpha multivibrator 18 includes three vacuum tubes 136, 138, and 140, the input coupling condenser 139 being connected to the grid 144 of tube 136 through a resistor 146. A grid resistor 147 is connected between the junction of condenser 139 and resistor 146 to the common ground. The plate 148 of vacuum tube 136 is connected to the plate 150 of vacuum tube 138, and to the grid 152 of vacuum tube 140 through a coupling condenser 154. The plates 150 and 156 of vacuum tubes 138 and 140, respectively, are connected through plate resistors 158 and 160 to the positive terminal of a battery 162. The negative terminal of the battery 162 is connected to the common ground. The grid 164 of vacuum tube 138 is also connected to the common ground through a resistor 166. The cathode 168 of vacuum tube 136 is connected to the common ground through a by-pass condenser 170 and resistors 172 and 174, resistor 174 being a voltage divider. The cathode 176 of vacuum tube 138 is connected to the cathode 178 of vacuum tube 140, and to the common ground through a common cathode resistor 180. A grid resistor 182 is connected between the cathode 178 of vacuum tube 140 and its grid 152. The plate 156 of vacuum tube 140 is coupled to the alpha scaler 24 through a coupling condenser 184 and a voltage divider consisting of resistors 186 and 188 connected to the common ground. The cathode 168 of vacuum tube 136 is connected to the positive terminal of battery 44 through resistor 190, and thus receives a positive potential.

It has been found that vacuum tube 136 may be a type 6C4, and that vacuum tubes 138 and 140 may be type 12AU7. Suitable batteries for both battery 44 and 162 may have an E. M. F. of 150 volts, and plate resistors 158 and 160 may be 47,000 ohms and 10,000 ohms, respectively. Coupling condensers 139, 154, 184 may be 0.01 mfd., 0.001 mfd. and 25 mmfd., respectively. The cathode resistors 172 and 174 of vacuum tube 136 may be 3,600 ohms and 25,000 ohms, respectively, while the cathode by-pass condenser 170 may be 50 mfd. A suitable value for resistor 190 connected between the cathode 168 of vacuum tube 136 and the positive terminal of battery 44 is 82,000 ohms. The grid resistor 166 for vacuum tube 138 may be 330,000 ohms, and the cathode resistor 180 for vacuum tubes 138 and 140 may be 2,700 ohms.

The beta multivibrator 20 is constructed with an identical electrical circuit to the alpha multivibrator 18, but some of the circuit constants are different. It also consists of three triode vacuum tubes 192, 194 and 196, the grid 198 of tube 192 being connected to the plate 137 of vacuum tube 82 of the beta amplifier 16 in a manner identical to the connection between the amplifier 14 and the grid 144 of vacuum tube 136 of the alpha multivibrator 18. As in the case of the alpha multivibrator 18, the cathode 200 of vacuum tube 192 is connected to the positive terminal of battery 44 through a resistor 202. The grid resistor 204 and coupling condenser 206 connected to the grid 208 of vacuum tube 196 have different values than the corresponding elements 182 and 154 in the alpha multivibrator 18. It has been found that condenser 206 may be 500 mmfd. and resistor 204 may be 100,000 ohms. Battery 162 is used to supply plate voltage to tubes 192, 194 and 196, as in the alpha multivibrator 18. A coupling condenser 210 is connected to the plate 212 of vacuum tube 196, and couples the output of the beta multivbrator 20 to the gated multivibrator 22.

The gated multivibrator 22 has two vacuum tubes 214 and 216. These tubes 214 and 216 have plates 218 and 220 which are connected to the positive terminal of battery 162 through plate resistors 222 and 224. The tubes 214 and 216 also have interconnected screen grids 226 and 228 which are connected to the positive terminal of battery 162. The control grid 230 of vacuum tube 214 is connected to the plate 212 of vacuum 196 in the beta multivibrator through the coupling condenser 210, and is also connected to the positive terminal of the battery 162 through resistor 232 and to the negative terminal of battery 162 through resistor 234. The cathodes 236 and 238 of tubes 214 and 216 are interconnected, and connected to the common ground through a single cathode bias resistor 240. The suppressor grid 242 of vacuum tube 216 is connected to the cathode 238 of that tube through resistor 244, forming a pulse control circuit while suppressor grid 246 of tube 214 is connected directly to the cathode 236 of that tube. Suppressor grid 242 of vacuum tube 216 is also connected to the plate 148 of vacuum tube 136 in the alpha multivibrator 18 through coupling condenser 248. The grid 250 of vacuum tube 216 is connected to the plate 218 of vacuum tube 214 through the coupling condenser 252, and grid resistor 254 is connected from the grid 250 to the common ground. The output of the gated multivibrator 22 is conducted from the plate 220 of vacuum tube 216 through a condenser 256 to the beta scaler 26 through a voltage divider consisting of resistors 257 and 258 connected to the common ground.

It has been found that vacuum tubes 214 and 216 may be type 6AU6 tubes, and that they may have plate resistors 222 and 224 of 22,000 ohms and 10,000 ohms, respectively. The grid coupling condenser 252 between the plate 218 of tube 214 and the grid 250 of tube 216 may be 0.0001 mfd., and the coupling condenser 256 between the plate 220 of vacuum tube 216 and the beta scaler 26 may be 25 mmf. The grid resistors 234 and 254 for vacuum tubes 214 and 216 may be 56,000 ohms and 100,000 ohms, respectively. A suitable cathode resistor 240 may be 10,000 ohms. The voltage dividers consisting of resistors 186 and 188 and 257 and 258 connected across the alpha scaler 24 and the beta scaler 26, respectively, may be made up of 10,000 ohms for resistors 186 and 258 and 1,000 ohm resistors for resistors 188 and 257.

When in operation, the counter circuit produces pulses in response to radiations and particles impinging upon the counter tube 28. The higher the ionization produced by the particles or radiations, the greater the amplitude of the pulse appearing across resistor 32, and hence the beta pulses will be of much smaller amplitude than those produced by alpha particles. The cathode follower 12 conducts the pulses produced by the counter circuit 10 to the amplifier 14, and provides a low impedance input to the amplifier 14. The amplifier 14 amplifies the pulses, whether these pulses have small amplitudes or large amplitudes, and transmits the amplified pulses to both the alpha multivibrator 18 and the beta amplifier 16. It will be seen that the pulses generated by the counter circuit will appear as negative pulses on the grid 38 of the cathode follower 12 and on the grid 54 of the amplifier 14, but will appear as positive pulses on the grid 88 of vacuum tube 76 in the beta amplifier 16 and on the grid 144 of the vacuum tube 136 in the alpha multivibrator 18.

The beta amplifier 16 can only amplify positive pulses, because the diode 84 connected between the plates 104 and 118 is slightly conducting when no signal is being applied to the beta amplifier 16. This in effect provides a low impedance path between the plate 118 of vacuum tube 78 and the plate 104 of vacuum tube 76. Hence, a negative pulse upon the grid 88 of vacuum tube 76 would merely have the effect of increasing the positive potential applied to the plates 122 of the diode 84, and increase the current flowing therethrough. Thus, there is little tendency for low frequency oscillation to develop in the beta amplifier 16, and the negative overshoots produced by the differentiation of the pulse by condenser 90 will not enter into the operation of the circuit. However, a positive pulse applied to the grid 88 of vacuum tube 76 will decrease the potential applied to the plates 122 of the diode 84, and cause the diode 84 to cease conducting, thereby providing high amplification in the beta amplifier 16. The plate 118 of vacuum tube 78 also produces a positive pulse which is conducted through the second stage of amplification in the beta amplifier 16, and will be amplified in an identical manner by tubes 80, 82 and 86. It is to be noted, that the beta amplifier 16 is capable of handling input pulses having an amplitude ratio as great as 1,000 to 1.

The output of the amplifier 14, including both beta and alpha pulses, is also impressed upon the grid 144 of vacuum tube 136 in the alpha multivibrator 18, but because of the low amplitude of the beta pulses, only the alpha pulses will be effective to trigger the alpha multivibrator 18. The circuit is so arranged, that the grid 152 of vacuum tube 140 is more positive than the grid 164 of vacuum tube 138, and hence tube 140 will be conducting to a greater extent than tube 138. When a positive pulse is applied to the grid 144 of tube 136, tube 136 amplifies the pulse and transmits a negative pulse to the grid 152 of tube 140. This causes the plate current in tube 140 to decrease, and also decreases the cathode bias voltage on both tube 138 and 140 since there is a common cathode resistor 180. In effect, the grid 164 of tube 138 becomes more positive, and tube 138 conducts to a greater extent. This in turn causes the voltage drop across the cathode bias resistor 180 to increase, and hence the grid 152 of vacuum tube 140 to become more positive, and the original circuit conditions to be re-established. The circuit constants have been selected to produce a $300 \times 10^{-6}$ second square wave for each pulse impressed on grid 144 of tube 136, which is conducted to the alpha scaler 24 and there recorded.

The output of the beta amplifier 16 is conducted to the beta multivibrator 20, which operates in an identical manner with the alpha multivibrator 18. However, the circuit constants are different to produce a $60 \times 10^{-6}$ second square wave pulse for each pulse conducted to the beta multivibrator 20, rather than the longer pulse produced by the alpha multivibrator 18. Both the alpha and beta produced pulses will produce square wave pulses in the output of the beta multivibrator 20, since both are introduced to the beta multivibrator 20.

The output of the beta multivibrator 20 is conducted to the gated multivibrator 22 through the coupling condenser 210. The coupling condenser 210 and the grid resistor 234 for vacuum tube 214 differentiate the positive pulses emerging from the output in the beta multivibrator 20, so that there is a negative trailing edge on the pulses impressed upon the grid 230 of vacuum tube 214. Vacuum tube 214 is normally conducting, since a positive bias is placed upon the grid 230 by the voltage divider consisting of resistors 232 and 234 which is connected across the battery 162. The negative trailing edge of each pulse from the beta multivibrator 20 decreases the flow of plate current in tube 214 and places a positive pulse upon the grid 250 of vacuum tube 216. This in turn will cause plate current to flow in the tube 216, the tube normally being biased beyond cutoff by the voltage developed across the cathode resistor 240. The output pulse from the plate 220 of vacuum tube 216 is conducted to a beta scaler 26 and counted. However, alpha pulses are not counted by the scaler 26 because a negative pulse is placed upon the suppressor grid 242 of vacuum tube 216 for each alpha pulse preventing tube 216 from conducting. When an alpha pulse triggers the alpha multivibrator 18, a negative pulse appears upon the plate 148 of vacuum tube 136, and this pulse is conducted through condenser 248 to the suppressor grid 242 of vacuum tube 216. This negative pulse from the alpha multivibrator 18 is approximately $300 \times 10^{-6}$ seconds in duration, and is adequate to blank out the alpha pulse and any spurious pulses which might emerge from the beta amplifier 16 during this period of time, so that these pulses are not counted by the beta scaler 26.

It is to be noted that the actual number of alpha induced pulses are counted by the alpha scaler 24, but the beta scaler 26 will not count the beta pulses occurring during the period that the gated multivibrator 22 blocks their path to the beta scaler 26. This however does not greatly affect the accuracy of the instrument, because the pulses are random in nature, and a correction may be applied to the beta pulses recorded based on the number of alpha pulses and the duration of the pulses from the alpha and beta multivibrator 18 and 20. Hence, accurate simultaneous measurement of both alpha and beta particles may be achieved by this instrument.

The man skilled in the art will readily understand that the device described herein has utility for measuring pulses of any type, and not those generated by radiation measuring devices alone. For this reason, it will be understood that the intended scope of the invention is not limited to the specific device disclosed, but rather by the appended claims.

What is claimed is:

1. A device for detecting alpha and beta particles from a common source comprising, in combination, means for producing an electrical pulse for each alpha and beta particle emanating from said source, a first multivibrator connected to the source of pulses and having sufficient sensitivity to be triggered only by the alpha particle produced pulses and producing pulses of uniform time duration, an amplifier having an input circuit connected to the means for producing electrical pulses, a second multivibrator connected to the output of said amplifier and having sufficient sensitivity to be triggered by both the alpha and beta particle produced pulses, the duration of the pulses from said second multivibrator being short compared to the duration of the pulses from the first multivibrator and a gated multivibrator having a first pulse control circuit connected to the output of the second of said multivibrators, said gated multivibrator also having a second pulse control circuit coupled to the first of said multivibrators and becoming inoperative from pulses from said first multivibrator for the duration of each pulse thereof, whereby the output of the gated multivibrator consists of the beta pulses and the output of the first multivibrator consists of the alpha pulses.

2. A device for detecting alpha and beta particles from a common source comprising the elements of claim 1 wherein the gated multivibrator comprises a first vacuum tube stage with a grid-to-cathode circuit and a plate-to-cathode circuit, the tube being biased to normally conduct plate current, the grid being connected to the output of the second multivibrator, and the plate-to-cathode circuit having a plate impedance and cathode impedance, and a second vacuum tube stage having a grid coupled to the plate of the first stage, and a suppressor grid-to-cathode pulse control circuit coupled to the first multivibrator, said pulse control circuit cutting off the flow of plate current in said second vacuum tube in response to negative pulses from said first multivibrator.

3. A device for detecting alpha and beta particles from a common source comprising the elements of claim 1 wherein the amplifier connected between the means for producing electrical pulses and the second multivibrator comprises at least one vacuum tube amplifier stage comprising, a first vacuum tube amplifier having an input circuit connected to its grid and cathode and an output circuit including a plate resistor connected to its plate and cathode, a second vacuum tube amplifier having a grid-to-cathode input circuit coupled to the output circuit of the first amplifier and a plate and cathode output circuit, and a third vacuum tube having a cathode connected to the plate of the output circuit of the second of said vacuum tube amplifiers and a plate connected to the plate of the output circuit of the first of said vacuum tube amplifiers.

4. A device for detecting alpha and beta particles from a common source comprising the elements of claim 1 wherein at least one of the multivibrators comprises a first vacuum tube having a grid-to-cathode input circuit and a plate-to-cathode output circuit including a plate impedance, the grid of said tube being biased negatively with respect to the cathode cutting off the flow of plate current through said tube, a second vaccum tube having a grid-to-cathode circuit including a cathode impedance and a plate-to-cathode output circuit including a plate impedance, the grid of said tube being coupled to the plate of said first tube and said tube being biased to be normally conducting, and a third vaccum tube having a plate connected to the plate of the first vacuum tube, a cathode connected to the cathode of the second vacuum tube, and a grid biased to be normally slightly conducting.

5. A radiation measuring device comprising the elements of claim 1 wherein the means for producing electrical pulses comprises a counter tube connected to the input of the amplifier and the first multivibrator.

6. A radiation measuring device comprising the elements of claim 5 in combination with a first scaler connected to the output of the first multivibrator and a second scaler connected to the output of the gated multivibrator for counting the pulses produced by each of the multivibrators.

7. A device for detecting alpha and beta particles from a common source comprising, in combination; means for producing an electrical pulse for each alpha and beta particle emitted from said source, a first multivibrator having a pulse control circuit connected to the means for producing electrical pulses and having sufficient sensitivity to be triggered only by the alpha particle produced pulses, said first multivibrator producing pulses of uniform time duration and including a first vacuum tube having a grid-to-cathode input circuit and a plate-to-cathode output circuit including a plate impedance, the grid of said tube being negatively biased to cut off the flow of current through said tube, a second vacuum tube having a grid-to-cathode circuit including a cathode impedance and a plate-to-cathode circuit including a plate impedance, the grid of said tube being coupled to the plate of the first vacuum tube and said tube being biased to be normally conducting, and a third vacuum tube having a plate connected to the plate of the first vacuum tube, a cathode connected to the cathode of said second tube, and a grid, said tube being biased to be normally slightly conducting; a second multivibrator connected to the means for producing electrical pulses having sufficient sensitivity to be triggered by both the alpha and beta particle produced pulses, said second multivibrator producing pulses of shorter time duration than the first multivibrator and including the elements of the first multivibrator; and a gated multivibrator connected to the output of said second multivibrator including a first vacuum tube stage with a grid-to-cathode circuit and a plate-to-cathode circuit including a plate impedance and a cathode impedance, and the grid being coupled to the plate of the second vacuum tube of the second multivibrator, said grid being biased positively with respect to the cathode of said tube, a second vacuum tube having a control grid coupled to the plate of the first vacuum tube and a cathode connected to the cathode of the first vacuum tube, said second vacuum tube having a suppressor grid-to-cathode pulse control circuit coupled to the plate of the first tube of the first multivibrator.

8. A radiation measuring device comprising the elements of claim 7 wherein the means for producing electrical pulses for each alpha and beta particle comprises a proportional counter coupled to the grid circuits of the first vacuum tube in the first and second multivibrators.

9. A device for detecting alpha and beta particles from a common source comprising, in combination, means for producing an electrical pulse for each alpha and beta particle emanating from said source, a first multivibrator connected to the means for producing electrical pulses having sufficient sensitivity to be triggered only by the alpha particle produced pulses and producing pulses of uniform time duration, a second multivibrator connected to the means for producing electrical pulses having sufficient sensitivity to be triggered by both the alpha and beta particle produced pulses and producing electrical pulses of shorter time duration than the first multivibrator, and a gated multivibrator connected to the first and second multivibrators, said gated multivibrator being triggered by the pulses produced by the second multivibrator and inactivated by the pulses produced by the first multivibrator, whereby the pulses produced by the first multivibrator are responsive to the alpha particles emanating from the source and the pulses produced by the gated multivibrator are responsive to the beta particles emanating from the source.

10. A device for separating pulses of two different amplitudes from a common source comprising, in combination, a first multivibrator adapted to be connected to the source of pulses and having sufficient sensitivity to be triggered only by pulses having magnitudes above a first threshold value, said multivibrator producing pulses of uniform time duration, a second multivibrator having an input connected in parallel with the input of the first multivibrator and having sufficient sensitivity to be triggered by pulses having amplitudes greater than a second threshold value which is lower than the first threshold value, the pulses produced by the second multivibrator being of shorter time duration than the pulses produced by the first multivibrator, and a gated multivibrator having a first control circuit connected to the output of the second multivibrator and a second control circuit coupled to the output of the first multivibrator, said gated multivibrator becoming inoperative from pulses from said first multivibrator for the duration of each pulse thereof, whereby the output of the gated multivibrator consists of pulses having amplitudes between the lower and higher threshold values, and the output of the first multivibrator consists of the pulses having amplitudes greater than the higher threshold value.

References Cited in the file of this patent

UNITED STATES PATENTS

| | | |
|---|---|---|
| 2,514,135 | Neil | Mar. 4, 1949 |
| 2,557,636 | Crumrine | June 19, 1951 |
| 2,576,900 | Brockman | Nov. 27, 1951 |
| 2,584,138 | Lichtman | Feb. 5, 1952 |

OTHER REFERENCES

"A Pulse Analyzer for Nuclear Research," Freundlich et al., Review of Scientific Instruments, February, 1947, pages 90–100.